United States Patent [19]

Manek et al.

[11] Patent Number: 5,494,607
[45] Date of Patent: Feb. 27, 1996

[54] ALKYL SUBSTITUTED PHENOL-POLYETHYLENEPOLYAMINE-FORMALDEHYDE RESINS AS ASPHALTENE DISPERSANTS

[75] Inventors: Maria B. Manek, Stafford; Kailash N. Sawhney, Sugar Land, both of Tex.

[73] Assignee: Nalco Chemical Company, Naperville, Ill.

[21] Appl. No.: 235,050

[22] Filed: Apr. 29, 1994

[51] Int. Cl.⁶ .............................. B01J 13/00; E21B 37/06
[52] U.S. Cl. .......................... 252/308; 252/314; 252/357; 166/304; 507/90
[58] Field of Search .................................. 252/308, 314, 252/357; 166/304; 208/22; 507/90; 106/278

[56] References Cited

U.S. PATENT DOCUMENTS

| | | | |
|---|---|---|---|
| 3,127,344 | 3/1964 | De Groote et al. | 252/357 X |
| 3,278,637 | 10/1966 | Kirkpatrick et al. | 252/357 X |
| 4,005,020 | 1/1977 | McCormick | 507/90 X |
| 4,207,193 | 6/1980 | Ford et al. | 166/304 X |
| 4,592,759 | 6/1986 | Naka et al. | 252/357 X |
| 4,830,740 | 5/1989 | Klimpel et al. | 209/167 |
| 4,931,164 | 6/1990 | Dickakian | 208/48 AA |
| 4,997,580 | 3/1991 | Karydas | 507/90 |
| 5,021,498 | 6/1991 | Stephenson et al. | 524/484 |
| 5,073,248 | 12/1991 | Stephenson et al. | 208/22 |
| 5,100,531 | 3/1992 | Stephenson et al. | 208/22 |
| 5,112,505 | 5/1992 | Jacobs et al. | 507/247 |
| 5,143,594 | 9/1992 | Stephenson et al. | 208/48 AA |

*Primary Examiner*—Richard D. Lovering
*Attorney, Agent, or Firm*—Robert A. Miller; James J. Drake

[57] ABSTRACT

Asphaltenes may be dispersed in caustic treated petroleum crude oil, or in any fraction thereof by adding an effective dispersing amount of a mono or di substituted alkylphenol-formaldehyde resin and or a monosubstituted alkylphenol-polyethylenepolyamine-formaldehyde resin, such resins having a weight average molecular weight of from about 1,000 to about 20,000, and an alkyl substituent containing from about 4 to about 24 carbon atoms, which alkyl substituent may be linear or branched.

4 Claims, No Drawings

ALKYL SUBSTITUTED PHENOL-POLYETHYLENEPOLYAMINE-FORMALDEHYDE RESINS AS ASPHALTENE DISPERSANTS

FIELD OF THE INVENTION

This invention relates to the prevention of asphaltene fouling in caustic treated crude oil and fractions thereof through the use of certain alkylphenol-formaldehyde, and alkylphenol-polyethylenepolyamine-formaldehyde resins.

INTRODUCTION

Process additives used to control the deposition of asphaltenes in the processing of crude oil treated with minor amounts of caustic used to control corrosion often fail even when the same process additive effectively controls the deposition of asphaltenes in the same crude oil when caustic is not utilized. Novel caustic resistant antifoulants and their methods of use are described. The antifoulants utilized are alkylphenol-formaldehyde, alkylphenolate-formaldehyde, and alkylphenol-polyethylenepolyamine-formaldehyde resins, wherein the alkyl group contains from 4–24 carbon atoms, and wherein in the alkylphenol-polyethylenepolyamine-formaldehyde resin, the polyethylenepolyamine is represented by the formula $H_2N-(CH_2-CH_2-NH-)_nH$, where "n" is an integer of from 1 to 5.

BACKGROUND OF THE INVENTION

Crude oil arriving at a refinery normally contains small amounts of water, solids, inorganic salts, and the like. To be effectively processed in a refining process, the crude oil is normally subjected to a desalting process whereby it is washed with water to remove soluble chloride, sulfate, and other corrosion causing salts. The art of desalting is well known to those skilled in the art of petroleum processing and will not be discussed herein in great detail. After the desalting process, the crude oil now containing a diminished amount of water and inorganic salts is subjected to processing. Normally one of the first processing steps is the distillation of the crude oil to separate it into fractions suitable for sale.

In the distillation of the crude oil high temperatures and pressures can be applied. If corrosion causing acid components are present along with small amounts of water, corrosion of distillation columns, overhead lines, processing lines and the like can take place. Likewise, solids remaining in the oil are generally treated by adding a dispersant to the crude oil. The dispersants serve to prevent the fouling of lines, overheads, and the like with asphaltenes.

Asphaltenes are the heaviest and the most polar components of crude oils. They are generally defined as a solubility class of the polydisperse, high molecular hydrocarbons which are insoluble in nonpolar solvents. Asphaltene particles are believed to exist in the form of colloidal dispersion stabilized by other components of the crude oil. These naturally occurring dispersions can be destabilized by a variety of mechanical and chemical conditions involved in oil production and processing. This can result in asphaltene aggregation, precipitation and eventual deposition of a tarry residue. Once precipitated, asphaltene solids pose a multitude of technological difficulties to crude oil production in that permeability blocking in the reservoir matrix, wells and pipelines. Likewise, plugging, deposition in treating vessels and the narrowing of flow lines can occur in processing. In the refinery processing of heavy crude oils, asphaltenes are known to foul metallic heat transfer surfaces, decreasing heat transfer efficiency.

The use of chemical treatments to inhibit asphaltene precipitation has become very important with the current tendency in the petroleum industry towards the exploration, drilling, production and processing of heavier oils, higher in asphaltene content. In recent years, a significant increase in the use of asphaltene inhibitors/dispersants has resulted. Asphaltene dispersants are known to aid in the production and processing of asphaltene crude oils. Among the references describing asphaltene dispersants are U.S. Pat. Nos. 4,931,164; 4,997,580; 5,112,505; and, U.S. Pat. Nos. 5,01,498; 5,073,248; 5,100,531 and 5,143,594 which disclose the use of a combination of two materials, an alkyl substituted phenol-formaldehyde resin and various hydrophilic-lipophilic vinylic polymers.

Refinery processing of heavier crude oils is greatly enhanced by the use of asphaltene dispersants which are used to prevent deposition throughout the entire crude oil handling process. While functioning satisfactorily in crude oil handling units not treated by alkali to control corrosion, decreases in performance are typically observed for known asphaltene dispersants when refinery systems are treated with caustic to reduce corrosion.

When used to control corrosion in crude units, only relatively small amounts of sodium hydroxide (caustic) are added, normally about 2 pounds per 1000 barrels of crude oil, or a level of about 20 parts per million of NaOH per million parts of crude oil. In addition, after proper desalter treatment, there is generally only 0.2% by weight water left in the crude.

This invention is related to a class of asphaltene dispersants that do not lose their activity when used in crude oil treated with caustic. The novel asphaltene dispersants of this invention are alkylphenol-formaldehyde and alkylphenol-polyethylenepolyamine-formaldehyde resins which are economical, commercially available, and do not interfere with other refinery operations.

OBJECTS OF THE INVENTION

It is therefore an object of this invention to provide to the art novel, crude oil asphaltene dispersants that can be used effectively in crude oil treated with caustic to neutralize corrosion forming components;

It is a still further object of this invention to provide to the art novel alkylphenol-formaldehyde and alkylphenol-polyethylenepolyamine-formaldehyde resins which can be utilized to effectively disperse asphaltenes in crude systems treated with caustic;

It is also an object of this invention to provide an effective treatment program to disperse asphaltenes in crude oil systems when such systems are treated with alkali to control corrosion. Further objects will appear hereinafter.

DESCRIPTION OF THE INVENTION

This invention accordingly relates to a method of dispersing asphaltenes in caustic treated petroleum crude oil, or in any fraction thereof which comprises adding an effective dispersing amount of an asphaltene dispersant to said caustic treated petroleum, crude oil, or fraction thereof, the dispersant comprising a mono or disubstituted alkylphenol-formaldehyde resin, and/or a monosubstituted alkylphenol-polyethylenepolyamine-formaldehyde resin said resins having a weight average molecular weight of from about 1,000 to about 20,000, alkyl substituent(s) containing from about 4 to about 24 carbon atoms, which alkyl substituent may be a linear or branched alkyl group, and wherein in the alkylphenol-polyethylenepolyamine-formaldehyde resin the polyethylenepolyamine is represented by the formula $H_2N—(CH_2—CH_2—NH—)_nH$ where n is an integer of from 1 to 5.

We have discovered that mono and/or disubstituted alkylphenol-formaldehyde resins and/or monosubstituted alkylphenol-polyethylenepolyamine-formaldehyde resins, said resins having weight average molecular weights of from about 1,000 to about 30,000 an alkyl substituent containing from 4–24 carbon atoms, which alkyl substituent may be a linear or branched group, and wherein in the alkylphenol-polyethylenepolyamine-formaldehyde resin, the polyethylenepolyamine is represented by the formula $H_2N—(CH_2—CH_2—NH—)_nH$ where n is an integer of from 1 to 5 provide surprisingly effective dispersant activity in the dispersion of petroleum asphaltenes under caustic conditions, and far outperform other known commercially available dispersants.

In a preferred embodiment of this invention, the substituted phenol-formaldehyde resins are derived from mono or disubstituted phenols, or mixtures thereof where the substituents may be linear or branched alkyl groups each containing 9–16 carbon atoms. Preferably the weight average molecular weight of these resins range from about between 2,000 to about 8,000.

In the most preferred embodiment of this invention, the alkyl substituted resin is a resin derived from an acid catalyzed or base catalyzed reaction of the mixture of nonyl and dinonyl phenols with formaldehyde at a mole ratio of from about 2:1 to about 1:2 of combined phenols to formaldehyde, which resin has a weight average molecular weight ranging between about 2,000 to about 10,000. In a particularly preferred embodiment of the invention, the weight ratio of nonyl phenol to dinonyl phenol ranges from about 12:1 to about 6:1

In yet another most preferred embodiment of this invention, the monosubstituted alkylphenol-polyethylenepolyamine-formaldehyde resin is a resin derived from a base catalyzed reaction of the mixture of nonylphenol and polyethylenepolyamine in molar ratio of 5:1 and 3:1 with formaldehyde, and the combined alkylphenol-polyethylenepolyamine to formaldehyde ratio is from about 2:1 to 1:2, which resin has a weight average molecular weight of about 2,000 to about 10,000. Method for the preparation of the alkylphenol formaldehyde resins and the alkylphenol-polyethylenepolyamine-formaldehyde resins are wellknown in the art and it is not within the spirit of this invention to prefer one synthetic route over another. Alkylphenol-formaldehyde and alkylphenol-polyethylenepolyamine-formaldehyde resins meeting the parameters described above are available from a variety of commercial sources. The synthesis of these materials is also well known in the art and those skilled in the art will be readily able to manufacture resins meeting the parameters set forth above.

Tables 1–3 show results of asphaltene dispersant testing of various alkylphenol-formaldehyde and alkylphenol-polyethylenepolyamine-formaldehyde resins under normal and caustic conditions. Alkylphenol-formaldehyde resins have earlier been described to have moderate asphaltene dispersant activity where no caustic is used to pretreat the oil in U.S. Pat. No. 5,021,498 which is hereinafter incorporated by reference into this specification. In the present invention, these resins have been found to exhibit outstanding performance under caustic conditions. The dispersant properties of the alkylphenol-formaldehyde and alkylphenol-polyethylenepolyamine-formaldehyde resins of this invention exhibit performance properties under caustic conditions which are unique as all other materials tested showed significant decreases in activity when placed in caustic systems.

In the Tables, alkylphenol-formaldehyde resins 5–9, and alkylphenol-polyethylenepolyamine-formaldehyde resin 13 are available commercially from Nalco Chemical Company, Naperville, Ill. under the trade names Visco® D4275m, R2209M, Z5096M, V2102M, V20353M, and J997M respectively. The resins are manufactured as the intermediate products which are further reacted or blended with other materials to form final products. They are never sold as they are. Resin 10 was an experimental material prepared by the polycondensation of a mixture of nonyl- and dinonylphenols (in a mole ratio of ca. 10:1) with formaldehyde in a heavy aromatic solvent. Resins 11 and 12 were polycondensates of a mixture of nonylphenol and saturated and unsaturated alkyl lo substituted phenol compounds, extracted from cashew nut oil, with formaldehyde in the presence of oxalic acid or sodium hydroxide.

In order to exemplify the resins of this invention, the following examples are presented:

Eight resins were refluxed in dilute solutions of aromatic naphtha with small a small amount of 5.0% by weight aqueous sodium hydroxide. The samples of solutions before and after reflux were subsequently evaluated as dispersants in accordance with the procedure set forth below. Along with the resins of this invention, several other commercial asphaltene dispersants were subjected to the reflux under caustic as described and tested.

The following test procedure was used for evaluating the ability of various products to disperse asphaltenes. The method takes advantage of the differing solubility properties of the components of crude oils. In the method, n-hexane is used as a solvent. N-hexane, being a non-polar solvent promotes the agglomeration and precipitation of polar asphaltenes. The better the dispersant, the more asphaltenes will be solubilized in the hexane, and the less sedimentation will be observed. Crude oils with various asphaltene contents were used as an asphaltene source.

In the first step of the procedure, 10 ml of n-hexane is added to each of four 10 ml graduated centrifuge tubes. The crude oil selected, previously diluted with toluene (1:1 v/v) is subsequently added at levels of 50, 100, 200 and 300 microliters to each tube. The tubes are then allowed to stand for two hours. A dosage of crude oil with gives from 4–10% volume sedimentation after two hours is chosen to use in the next section of the test.

In the second step of the procedure, the precipitation of asphaltenes in the presence of dispersants is observed and compared with the sedimentation in a blank sample (no dispersant added). Dispersants are introduced into 10 ml of hexane in graduated centrifuge tubes at the desired dosage (10, 100, or 500 ppm). Aliquots of crude oil, determined in step one are then added and the tubes are shaken vigorously for about 30 seconds to dissolve soluble components into the nonpolar solvent, leaving destabilized asphaltenes to settle by gravity. The amount of solids precipitated on the bottom of the tubes is recorded after 15, 30, 60 and 120 minutes from the beginning of the test. The measure of performance is the volume percent of dispersed solids in comparison to a blank sample, i.e., the percent dispersion equals the precipitate volume of the blank minus the precipitate volume of the treated sample, divided by the precipitate volume of the blank, times one hundred. Final percent of dispersion is an average of values calculated for all four observations (15, 30, 60 and 120 minutes).

In addition, the resin solutions in aromatic naphtha were stirred with excess (i.e., 1.5 times the stoichiometric amount) of 30% by weight aqueous sodium hydroxide for I hour or until the change of color occurred. The organic phase containing the phenolate was separated from the aqueous phase and tested for asphaltene dispersant activity. The performance of the phenolate resins was found to be similar to the performance of caustic refluxed resins.

This procedure was used to evaluate performance of resins 1–8 and to compare them to other commercial products. The evaluation was conducted on three crude oil samples, coming from refineries which currently use caustic in their preheat crude units.

Commercial products tested along with the resins of the invention were designated as follows:

| Product A | A polyisobutylene-maleic anhydride product esterified with a polyol |
| Product B | An admixture of nonylphenol-formaldehyde resin and vinyl copolymer sold by Nalco Chemical Company under the trade name Control-1 |
| Product C | A vinyl polymer based product |
| Product D | an alkylarylsulfonic acid based product |

Results of the testing are shown in Table 1 below:

TABLE 1

| No. | Additive | M.W.[b] | Dose (ppm) | % Disp N.C.[c] | % Disp C.C.[d] |
|---|---|---|---|---|---|
| 1. | Commercial Product A | | 100 | 52.6 | 21.0 |
| 2. | Commercial Product B | | 100 | 37.3 | 31.0 |
| 3. | Commercial Product C | | 100 | 24.0 | 21.1 |
| 4. | Commercial Product D | | 100 | 2.5 | 8.5 |
| 5. | Amylphenol-formaldehyde resin | 3300 | 100 | 16.0 | 47.8 |
| 6. | Butylphenol-formaldehyde resin | 1500 | 100 | 9.1 | 41.0 |
| 7. | Butylphenol-nonylphenol-formaldehyde resin | 1400 | 100 | 19.0 | 29.0 |
| 8. | Nonylphenol-formaldehyde resin | 2200 | 100 | 22.7 | 48.0 |
| 9. | Nonylphenol-dinonylphenol-formaldehyde resin | 2000 | 100 | 41.1 | 47.9 |
| 10. | Nonylphenol-dinonylphenol-formaldehyde resin | 3200 | 100 | 51.6 | 55.0 |
| 11. | Nonylphenol-pentadecylphenol-formaldehyde resin[e] | 3000 | 100 | 17.2 | 38.0 |
| 12 | nonylphenol-pentadecylphenol-formaldehyde resin[f] | 23000 | 100 | 25.3 | 28.9 |

Crude oil from a Western state refinery as asphaltene source
[b]A weight average molecular weight determined by gel permeation chromatography (GPC)
[c]Performance under normal conditions (without caustic addition)
[d]Performance under caustic conditions
[e]Acid catalyzed condensation product of formaldehyde with a mixture of nonylphenol and a mixture of saturated and unsaturated alkyl substituted phenols extracted from cashew nut oil
[f]Analog of No. 11, base catalyzed

TABLE 2

| No. | Additive | M.W.[b] | Dose (ppm) | % Disp N.C.[c] | % Disp C.C.[d] |
|---|---|---|---|---|---|
| 1. | Commercial Product A | | 20 | 82.0 | 16.6 |
| 2. | Commercial Product B | | 20 | 36.3 | 14.2 |
| 3. | Commercial Product C | | 20 | 14.2 | 16.6 |
| 4. | Commercial Product D | | 20 | 4.7 | 0 |
| 5. | Amylphenol-formaldehyde resin | 3300 | 20 | 33.0 | 64.5 |
| 6. | Butylphenol-formaldehyde resin | 1500 | 20 | 20.1 | 44.4 |
| 7. | Butylphenol-nonylphenol-formaldehyde resin | 1400 | 20 | 59.5 | 76.0 |
| 8. | Nonylphenol-formaldehyde | 2200 | 20 | 56.3 | 58.4 |

TABLE 2-continued

| No. | Additive | M.W.[b] | Dose (ppm) | % Disp N.C.[c] | % Disp C.C.[d] |
|---|---|---|---|---|---|
| | resin | | | | |
| 9. | Nonylphenol-dinonylphenol-formaldehyde resin | 2000 | 20 | 78.8 | 58.5 |
| 10. | Nonylphenol-dinonylphenol-formaldehyde resin | 3200 | 20 | 59.8 | 77.2 |
| 11. | Nonylphenol-pentadecylphenol-formaldehyde resin[e] | 3000 | 20 | 42.0 | 45.0 |
| 12. | Nonylphenol-pentadecylphenol-formaldehyde resin[f] | 23000 | 20 | 45.3 | 48.0 |
| 13. | Nonylphenol-diethylenetriamine-formaldehyde resin | 1800 | 20 | 100 | 100 |

Crude oil from a Southern state refinery as asphaltene source
[b]A weight average molecular weight determined by gel permeation chromatography (GPC)
[c]Performance under normal conditions (without caustic addition)
[d]Performance under caustic conditions
[e]Acid catalyzed condensation product of formaldehyde with a mixture of nonylphenol and a mixture of saturated and unsaturated alkyl substituted phenols extracted from cashew nut oil
[f]Analog of No. 11, base catalyzed

TABLE 3

| No. | Additive | M.W.[b] | Dose (ppm) | % Disp N.C.[c] | % Disp C.C.[d] |
|---|---|---|---|---|---|
| 1. | Commercial Product A | | 20 | 100.0 | 32.2 |
| 2. | Commercial Product B | | 20 | 58.7 | 43.3 |
| 3. | Commercial Product C | | 20 | 5.5 | 5.5 |
| 4. | Commercial Product D | | 20 | 14.8 | 11.2 |
| 5. | Amylphenol-formaldehyde resin | 3300 | 20 | 53.0 | 100.0 |
| 6. | Butylphenol-formaldehyde resin | 1500 | 20 | 36.2 | 69.5 |
| 7. | Butylphenol-nonylphenol-formaldehyde resin | 1400 | 20 | 43.0 | 75.2 |
| 8. | Nonylphenol-formaldehyde resin | 2200 | 20 | 42.7 | 97.7 |
| 9. | Nonylphenol-dinonylphenol-formaldehyde resin | 2000 | 20 | 82.6 | 100.0 |
| 10. | Nonylphenol-dinonylphenol-formaldehyde resin | 3200 | 20 | 85.0 | 100.0 |
| 11. | Nonylphenol-pentadecylphenol-formaldehyde resin[e] | 3000 | 20 | 40.0 | 45.0 |
| 12. | Nonylphenol-pentadecylphenol-formaldehyde resin[f] | 23000 | 20 | 49.0 | 50.8 |
| 13. | Nonylphenol-diethylenetriamine-formaldehyde resin | 1800 | 20 | 100 | 100 |

Crude oil used from a Central state refinery as asphaltene source
[b]A weight average molecular weight determined by gel permeation chromatography (GPC)
[c]Performance under normal conditions (without caustic addition)
[d]Performance under caustic conditions
[e]Acid catalyzed condensation product of formaldehyde with a mixture of nonylphenol and a mixture of saturated and unsaturated alkyl substituted phenols extracted from cashew nut oil
[f]Analog of No. 11, base catalyzed As seen the asphaltene dispersants of this invention exhibit superior properties in the treatment of caustic containing oils.

Having this described over invention, we claim:

1. A method of dispersing asphaltenes in caustic treated petroleum, crude oil or in any fi-action thereof which comprises adding an effective dispersing amount of an asphaltene dispersant to said caustic treated petroleum, crude oil, or fraction thereof, the dispersant comprising a monosubstituted alkylphenol-polyethylenepolyamine-formaldehyde resin having been prepared by the base catalyzed reaction of:

a. a monosubstituted alkylphenol having an alkyl substituent containing from about 4 to 24 carbon atoms, which alkyl substituent may be a linear or branched alkyl group;

b. a polyethylene polyamine represented by the formula:

$$H_2N-(CH_2-CH_2-NH-)_nH$$

where n is an integer of from 1 to 5; and, c. formaldehyde, in a mole ratio of alkylphenol to polyethylenepolyamine of from 5:1 to 3:1, and a mole ratio of alkylphenol to formaldehyde of from about 2:1 to 1:2, said resin having a weight average molecular weight of from about 1,000 to about 20,000.

2. The method of claim 1 wherein the alkyl substituent contains 9 carbon atoms.

3. The method of claim 1 wherein the resin has a weight average molecular weight of from about 2,000 to about 10,000.

4. The method of claim 1 wherein in the formula $H_2N-(CH_2-CH_2-NH-)_nH$, n is 2.

* * * * *

UNITED STATES PATENT AND TRADEMARK OFFICE
CERTIFICATE OF CORRECTION

PATENT NO. : 5,494,607
DATED : February 27, 1996
INVENTOR(S) : Maria B. Manek & Kailash N. Sawhney It is certified that error appears in the above-indentified patent and that said Letters Patent is hereby corrected as shown below:

Column 7, Claim 1, Line 64 petroleum, crude oil or in any [fi-action] thereof which

SHOULD READ AS:

petroleum, crude oil or in any fraction thereof which

Signed and Sealed this

Twenty-first Day of May, 1996

Attest:

BRUCE LEHMAN

Attesting Officer  Commissioner of Patents and Trademarks